H. C. JONES.
COCOANUT SHELL CRACKING MACHINE.
APPLICATION FILED JULY 2, 1919.

1,372,293.

Patented Mar. 22, 1921.
3 SHEETS—SHEET 1.

Inventor
Herbert C. Jones.
By Mason Fenwick & Lawrence,
Attorneys

H. C. JONES.
COCOANUT SHELL CRACKING MACHINE.
APPLICATION FILED JULY 2, 1919.
1,372,293.
Patented Mar. 22, 1921.
3 SHEETS—SHEET 2.
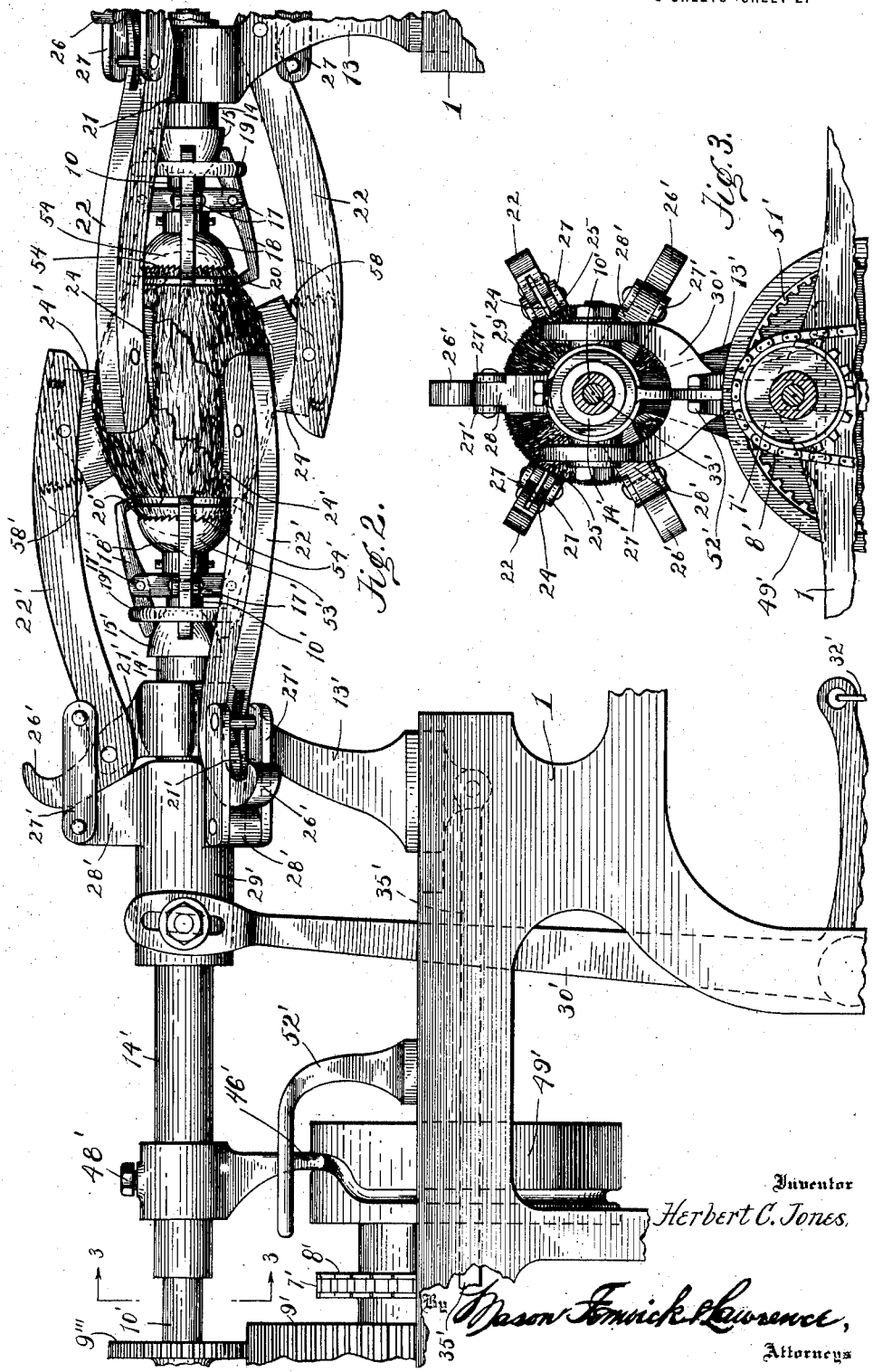

H. C. JONES.
COCOANUT SHELL CRACKING MACHINE.
APPLICATION FILED JULY 2, 1919.
1,372,293.
Patented Mar. 22, 1921.
3 SHEETS—SHEET 3.
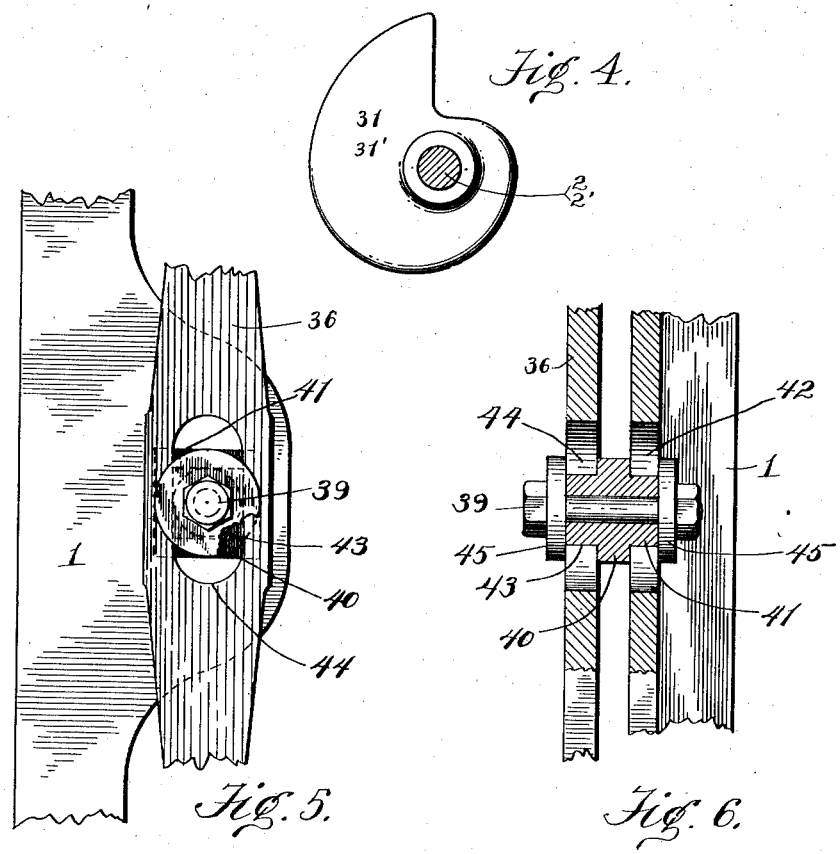
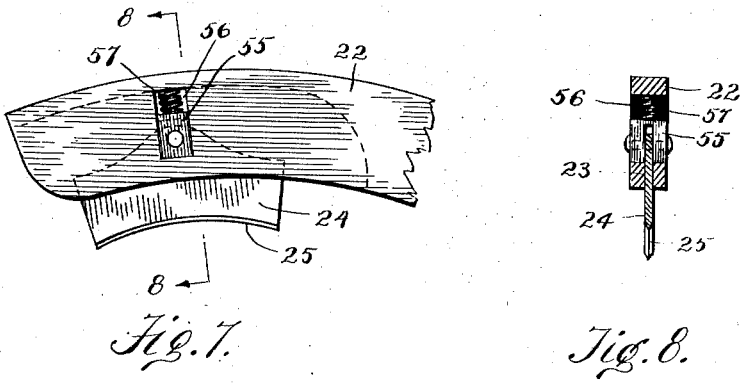
Inventor
Herbert C. Jones
By Mason Fenwick Lawrence,
Attorneys

UNITED STATES PATENT OFFICE.

HERBERT C. JONES, OF TOTTENVILLE, NEW YORK, ASSIGNOR TO THE FRANKLIN BAKER COMPANY, OF PHILADELPHIA, PENNSYLVANIA, A CORPORATION OF PENNSYLVANIA.

COCOANUT-SHELL-CRACKING MACHINE.

1,372,293.  Specification of Letters Patent.  Patented Mar. 22, 1921.

Application filed July 2, 1919. Serial No. 308,340.

*To all whom it may concern:*

Be it known that I, HERBERT C. JONES, a citizen of the United States, residing at Tottenville, S. I., in the county of Richmond and State of New York, have invented certain new and useful Improvements in Cocoanut-Shell-Cracking Machines; and I do hereby declare the following to be a full, clear, and exact description of the invention, such as will enable others skilled in the art to which it appertains to make and use the same.

This invention relates to a nut cracking and shelling machine and is in the nature of an improvement upon an application for patent on a similar device now pending and filed March 19, 1919, Serial No. 283,484.

The object of this invention is to provide a device of the character set forth wherein automatic feeding means for feeding and locking the rotating end scoring knives are provided.

A further object is to provide, in a device as set forth, automatic means for axially moving the holding cups to grip the nut and subsequently release the cracked nut.

Another object is to provide adjusting means for regulating the axial movement of the holding cups.

How these objects and other objects hereinafter disclosed and claimed are attained is illustrated in the accompanying drawings in which—

Fig. 2 is an enlarged detail view which will be hereinafter fully described;

Fig. 3 is a sectional elevation taken on line 3—3 of Fig. 2;

Fig. 4 is a detail of the cam for actuating the hammers;

Fig. 5 is an enlarged detail view showing a sliding fulcrum hereinafter fully described;

Fig. 6 is a section of same taken on line 6—6 of Fig. 5;

Fig. 7 is a detail view showing a modification and

Fig. 8 is a sectional view taken on line 8—8 of Fig. 7.

Figure 1:
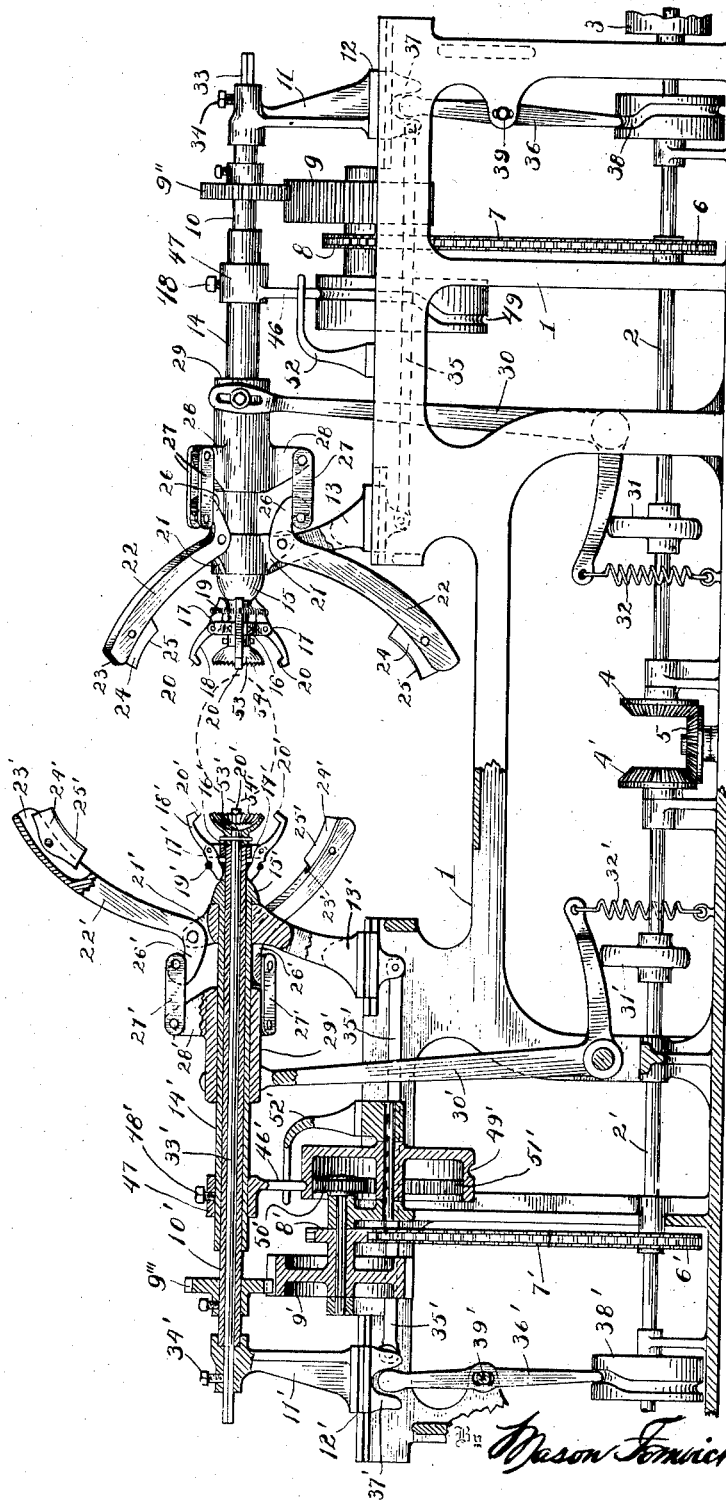
Figure 1 is a side elevation of a nut cracking machine embodying the principle of my invention and is shown partly in section.

Referring in detail to the parts, 1 designates a frame or body of a machine upon the base of which driving shafts 2 and 2' are mounted. The shaft 2 is provided with a pulley 3 affording a means for power transmission to drive the shafts.

At the inner ends of the driving shafts, bevel gears 4 and 4' are mounted which, coacting with bevel gear 5, gives opposite rotation to the two driving shafts.

The driving shafts are provided with sprockets 6 and 6' coacting with chains 7 and 7' and sprockets 8 and 8' to drive broad toothed gears 9 and 9' which are secured to hollow shafts 10 and 10', the outer ends of which are rotatably mounted in pedestals 11 and 11' in turn slidably mounted upon the bed of the frame as at 12 and 12'.

Slidably mounted pedestals 13 and 13' are similarly mounted upon the bed to support the inner ends of the hollow shafts and outer hollow shafts 14 and 14' are imposed upon the first mentioned hollow shafts and are provided with conical ends 15 and 15'.

The inner ends of the hollow shafts 10 and 10' are provided with annular shoulders or rings 16 and 16' having radially extending lugs or ears 17 and 17' upon which arms 18 and 18' are pivotally mounted and normally held in extended position by the action of spiral spring bands 19 and 19'. The outer ends of the pivoted arms are claw-shaped and formed with oppositely directed cutting edges 20 and 20'.

The pedestals 13 and 13' are formed with radially projecting ears or lugs 21 and 21' to which hammer or striking members 22 and 22' are pivotally secured.

The striking members are slotted at their outer ends, as shown at 23', and hold pivotal mounted knives or striking blades 24 and 24' having curved cutting edges 25 and 25'. The opposite ends of the hammer members are provided with hook ends 26 and 26' over which links 27 and 27' are adapted to engage. These links are pivotally connected to radially extending lugs 28 and 28' formed upon collars 29 and 29' slidably mounted upon the outer hollow shafts.

Longitudinal movement is given to the collars by means of cam actuated L levers 30 and 30' engaging against cams 31 and 31'. The lower arms of the L levers are normally held in contact against the cams by means of springs 32 and 32'.

Concentrically located within the hollow shafts are rods 33 and 33' secured against movement with respect to the hollow shafts 10 and 10' and the pedestals 11 and 11' by means of set screws 34 and 34' engaging against square end formations upon the rods.

The pedestals 11 and 13 and 11' and 13' are connected to move simultaneously by means of rods 35 and 35' and longitudinal movement is given to them by means of rocking arms 36 and 36', one end of each being adapted to engage in sockets 37 and 37' formed upon the pedestals 11 and 11' respectively while the other end engages in grooved cams 38 and 38' secured upon the shafts 2 and 2' respectively.

The fulcrum is adapted to longitudinal adjustment at 39 and 39' by means of blocks 40 and 40' (Figs. 5 and 6) having squared shanks 41 longitudinally movable in slots 42 formed upon the frame. Pivotal formations 43 are provided upon the opposite side of the block and are adapted to engage in slots 44 formed in the socket arms 36 and 36', the whole being held by means of washers 45 and suitable bolts as clearly shown in Figs. 5 and 6.

The wedge-shaped members or cones 15 and 15' upon the end of the outer hollow shafts 14 and 14' are fed against the short ends of the pivotal cutting arms 18 and 18' to bring the cutting edges in contact with the nut, by means of fingers 46 and 46' which are secured to the outer hollow tubes by means of the collars 47 and 47' and set screws 48 and 48' respectively.

The fingers co-act with peripherally grooved cam members 49 and 49' which are actuated by means of the gears 50 and 50' in engagement with internal gears 51 and 51' formed upon the peripheral cam members. The gears 50 and 50' are in turn driven by the gears 8 and 8'.

Forked members 52 and 52' are provided to engage the fingers to maintain same in proper alinement with grooved cam members.

Cup-shaped holding members 53 and 53' having saw toothed gripping ridges 54 and 54' formed thereon are secured to the inner ends of the rods 33 and 33' and held against rotation by means of the set screws in the pedestals 11 and 11'.

It will be noted that complementary members on opposite ends of the machine are designated by similar numerals but in the indications on one side the numerals are primed. It will also be noted in the specification that in some instances both numerals are used when but one is indicated upon the drawing. It is to be understood in such a case that both members are included.

In Figs. 7 and 8, a slight modification is shown wherein the blades 24 are held within the hammer members 22 by means of blocks 55 slidably mounted within the slots 56 and a spring 57 is positioned behind the block to take up part of the concussion when the blade strikes the nut.

A further slight modification is shown in Fig. 2 wherein cushion springs 58 and 58' are provided behind the ends of the blades.

Referring now to the operation of the parts. Fig. 1 shows the machine at rest just at the beginning of the first movement. In this position it will be observed that the hammer members, the pivoted cutting arms and the cup-shaped supporting members are at rest at their outermost position.

A cocoanut is now positioned approximately as shown by dotted lines in Fig. 1 and machine started. The rocking arm operates to move the pedestals inwardly carrying the cup-shaped supporting member into contact with the cocoanut to hold same in the position indicated.

Immediately following this movement, the wedge-shaped members or cones are moved inwardly and, by engagement with the contacting ends of the pivoted cutting members, cause the cutting edges to contact with the ends of the cocoanut.

The cutting members rotating in opposite directions cut a groove in the ends of the cocoanut and continue the cutting operation until, at a predetermined time, the hammer members are actuated to cause the blades to strike the nut a blow as indicated in Fig. 2 thereby fracturing the nut.

Following the blow by the blades, the hammer members swing back to their original position while the cones or wedge-shaped members, the pivoted cutting arms and cup-shaped supporting members move back to the first position shown in Fig. 1. The nut thereupon drops to any suitable container or conveying device (not shown).

The operation just described is repeated for every single operation of the driving shaft and by suitable gearing connections the cutting arms are caused to rotate any desired number of times for each single revolution of the driving shaft.

It is obvious that various modifications may be embodied in this invention without departing from the spirit of same and it is therefore understood that the invention, as herein set forth and claimed is not limited to the particular construction shown.

Having thus described this invention, I claim:

1. A nut cracking machine having cup-like supporting members for holding a nut therebetween, hammer elements extending on each side of the nut to be cracked, means for actuating the hammers to strike a blow upon the nut, pivotally mounted cutter arms adapted to cut into the ends of the nut and means for rotating the cutter arms and feeding same into the shell of the nut as the cut is made.

2. The device of claim 1 in which the hammer elements are provided with blades adapted to contact with the nut when a blow is struck by the hammers.

3. The device of claim 1 in which the hammer elements are provided with curved blades to contact with the nut when a blow is struck by the hammers.

4. The device of claim 1 in which the hammer elements are provided with pivoted blades adapted to contact with the nut when a blow is struck by the hammers.

5. The device of claim 1 in which the hammer elements are provided with curved rocking blades adapted to contact with and adapt themselves to the curvature of the nut when a blow is struck by the hammers.

6. The device of claim 1 in which the cup-like members have inturned teeth for gripping the nut.

7. The device of claim 1 in which the pivoted cutting members are provided with cutting edges, and means for rotating one member in a direction different from the direction of the one member, whereby the cutting edges will score the ends of the nut.

8. The device of claim 1 in which the pivoted cutting members are provided with spring arms, and cutting teeth on said arms.

9. A nut cracking machine having cup-like supporting members for holding a nut therebetween, pivotal hammer elements for striking the nut a blow, rotatably and pivotally mounted cutting arms adapted to rotate in opposite directions to score the ends of a nut, means for feeding the cutting members into the nut as the cut is made, automatic means for actuating the pivotal hammer elements and automatic means for moving the cup-like members away from the nut.

10. A nut cracking machine having spring actuated and pivotally mounted scoring arms for scoring the ends of a nut, means for automatically feeding the scoring arms into the nut as the cut is made, hammer elements provided with blades adapted to conform to and contact with the nut when a blow is struck by the hammers and means co-acting with the free ends of the hammer elements for actuating the hammers to strike a blow upon the nut and then to be retracted from the nut.

11. The device of claim 10 in which the co-acting means are automatically operated.

12. The device of claim 10 in which the co-acting means are reciprocal.

13. The device of claim 10 in which the co-acting means comprise reciprocal conical-faced collars, and links between the collars and free ends of the hammers.

14. The device of claim 10 with means for regulating the blow of the hammers.

15. A nut cracking machine having means for supporting the ends of a nut, spring actuated arms, having cutting edges, upon the supporting means, hammer arms adapted to strike blows upon the shell of the nut to crack same, and means for releasing the nut after the cracking operation.

16. A nut cracking machine having axially and oppositely disposed means for supporting the ends of a nut, pivoted spring actuated arms, having cutting edges, in juxtaposition to the supporting means, means provided for oppositely rotating the oppositely disposed pivoted arms, hammer arms adapted to strike blows upon the shell of the nut to crack same and means for releasing the nut after the cracking operation.

17. A nut cracking machine having cup-like members for supporting the ends of a nut to be cracked, pivoted hammer elements extending on each side of the nut to be cracked, pivotally mounted spring actuated cutting members adapted to score and cut into the ends of a nut, means for actuating the said pivoted cutting arms and means for causing the said hammers to strike a blow upon the nut.

18. The device of claim 17 in which the hammer elements are provided with blades adapted to contact with the nut when a blow is struck by the hammers.

19. The device of claim 17 in which the hammer elements are provided with curved blades to contact with the nut when a blow is struck by the hammers.

20. The device of claim 17 in which the hammer elements are provided with pivoted blades adapted to contact with the nut when a blow is struck by the hammers.

21. The device of claim 17 in which the hammer elements are provided with curved rocking blades adapted to contact with and adapt themselves to the curvature of the nut when a blow is struck by the hammers.

22. The device of claim 17 in which the cup-like members have inturned teeth for gripping the nut.

23. The device of claim 17 in which the pivoted cutting members are provided with cutting edges, and means for rotating one member in a direction different from the direction of the other member, whereby the cutting edges will score the ends of the nut.

24. The device of claim 17 in which the cup-like members are provided with spring actuated arms, and cutting teeth on said arms.

25. The device of claim 9 in which means are provided for regulating the movement of the cup-like supporting members.

26. The device of claim 1 in which means are provided for holding the nut against rotation.

27. The device of claim 9 in which means are provided for holding the nut against rotation.

28. The device of claim 15 in which means are provided for holding the nut against rotation.

29. The device of claim 17 in which means are provided for holding the nut against rotation.

30. The device as set forth in claim 1 in which the hammer elements are provided with resiliently mounted blades adapted to contact with the nut when the hammer elements are actuated.

31. The device as set forth in claim 1 in which the hammer elements are provided with cushioned pivoted blades adapted to contact with the nut when the hammer elements are actuated.

32. The device as set forth in claim 1 in which the hammer elements are provided with impact members adapted to contact with the nut when the hammer elements are actuated.

33. The device as set forth in claim 1 in which the hammer elements are provided with pivoted impact members adapted to contact with the nut when the hammer elements are actuated.

34. The device as set forth in claim 1 in which the cup-like members are provided with teeth for gripping the nut.

35. The device as set forth in claim 1 in which the cup-like members are peripherally serrated for gripping the nut.

36. The device as set forth in claim 1 in which the cup-like members are provided with peripherally inturned teeth for gripping the nut.

37. A nut cracking machine having supporting members for holding a nut therebetween, impact elements extending on each side of the nut to be cracked, means for actuating the impact elements to strike a blow upon the supported nut, cutters arranged to operate upon the shell of the nut and adapted to cut into the ends thereof, and means for rotating the cutters and feeding them into the shell of the nut as the cut is being made.

38. A nut cracking machine having means for supporting the ends of a nut, means for scoring the nut adjacent its end portions, and means for imparting a plurality of blows to the sides of the nut subsequent to the scoring action.

39. A nut cracking machine having means for gripping and thereby supporting the ends of a nut, means for scoring the nut adjacent its gripped ends, and means for imparting a series of opposing blows to the sides of the nut subsequent to the scoring action.

40. A nut cracking machine having means for gripping the opposing ends of a nut, means acting inwardly of the gripping means for scoring the adjacent ends of the supported nut, and means for imparting a series of opposing blows to the sides of the nut subsequent to the scoring action.

In testimony whereof I affix my signature.

HERBERT C. JONES.